Figure 1:
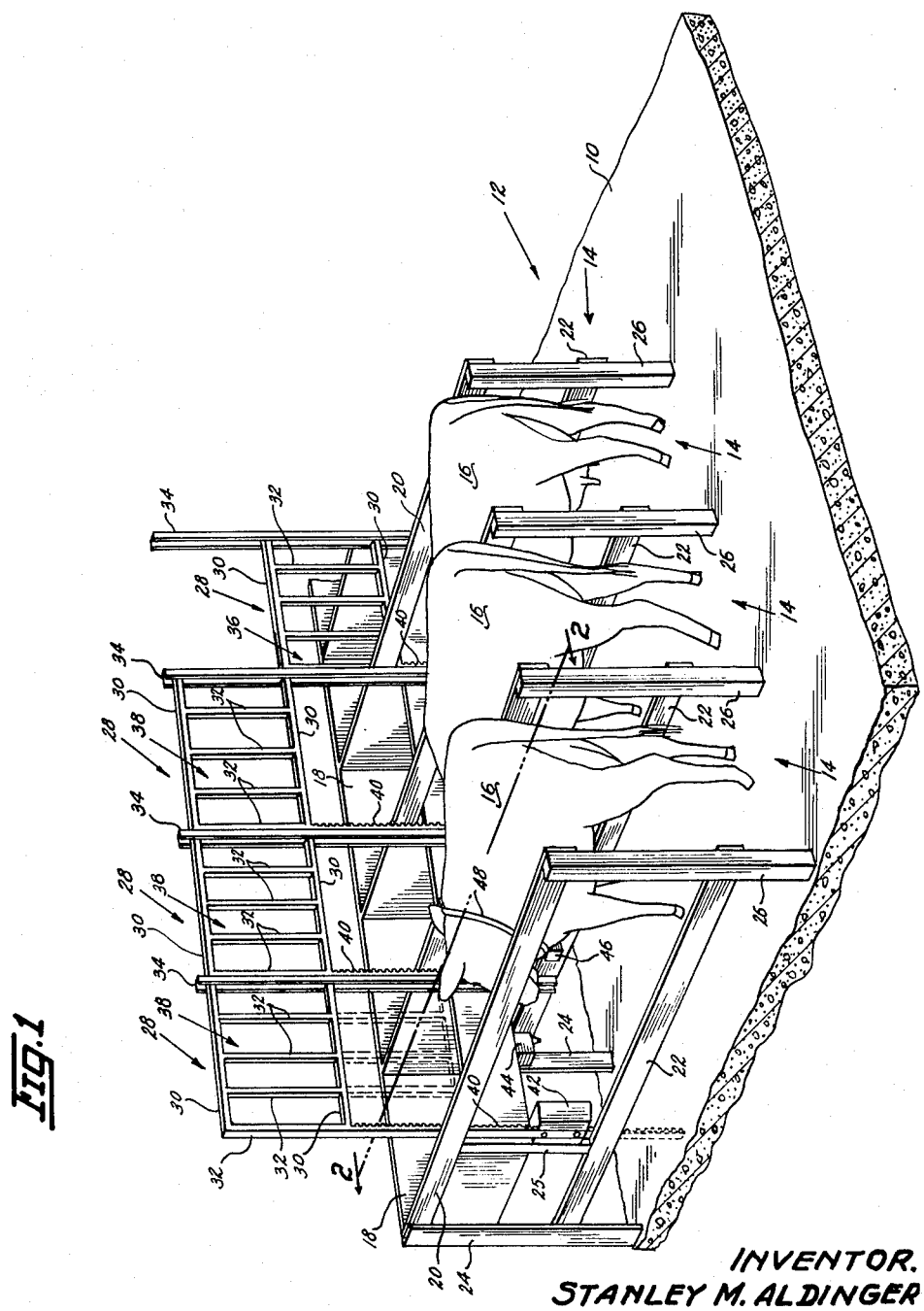

INVENTOR.
STANLEY M. ALDINGER
BY
ATTORNEY.

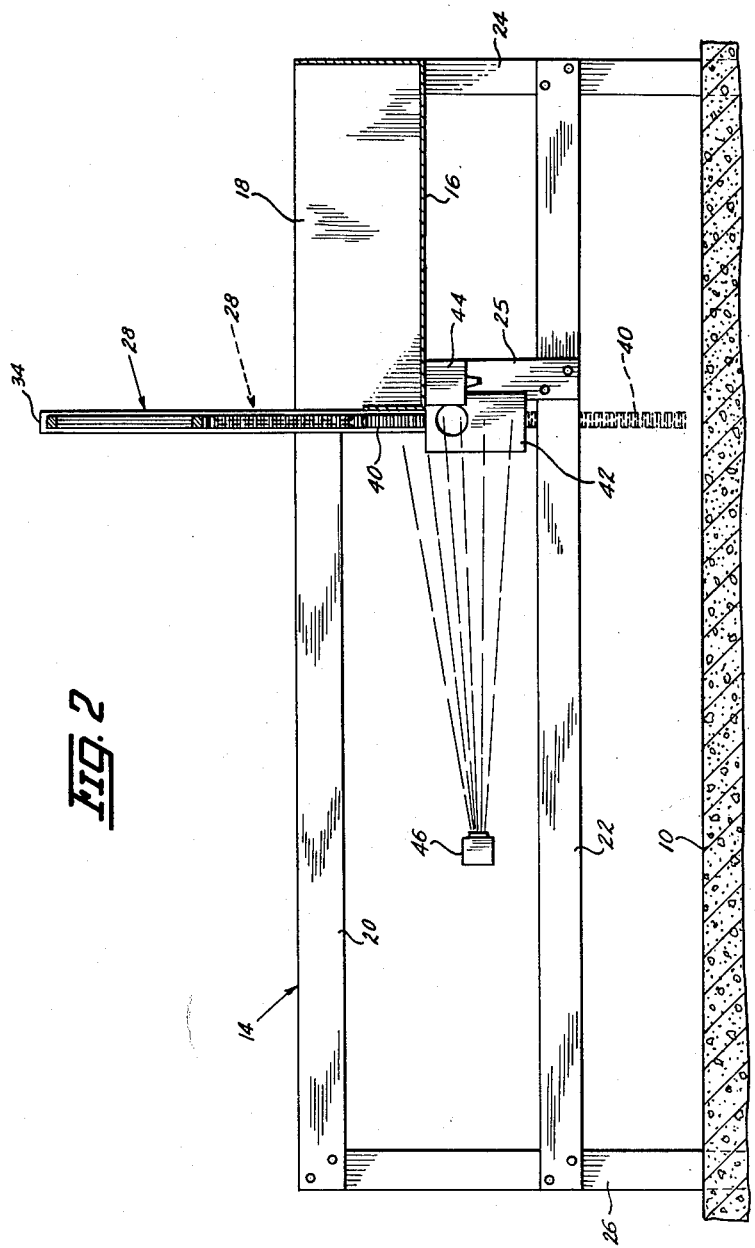

United States Patent Office 3,180,321
Patented Apr. 27, 1965

3,180,321
APPARATUS AND METHOD FOR FEEDING LIVESTOCK
Stanley M. Aldinger, 507 Meadow, Iowa City, Iowa
Filed Oct. 18, 1962, Ser. No. 231,339
12 Claims. (Cl. 119—51)

This invention relates to apparatus and a novel method for the controlled feeding of livestock.

In raising livestock for the market it is well recognized that a scientifically prepared and balanced ration in the feed used is a highly important factor affecting the condition of the animal at market stage and the profits which can be realized. Accordingly, many types and mixtures of feed are available in prepared form and many mixtures and formulas are constantly being devised and tested to continually improve their effectiveness. I have for some time been engaged with the problem of testing and evaluating such feed mixtures and formulas and one of the important objects contemplated herein is to materially improve upon the testing methods heretofore used and to thereby obtain results of much greater accuracy and value.

In evaluating the results and effects on livestock of various feed preparations, it is, of course, desirable that the tests for the different feeds be conducted under as like conditions as possible. Heretofore it has been customary to seek this objective in the following manner. A given number of cattle, for example, are put into a single pen and are fed formula A for a given period of time during which observations and records are kept of various factors such as weight changes and the like. In the present method of conducting such observations, all the animals in said pen eat from a common trough and while the feed supplied to such trough is carefully measured, the actual amount consumed per animal is merely averaged as, under present test procedures, this factor is not susceptible of accurate determination and therefore the results observed can only be approximate relative to any specific animal.

When several formulas are being tested for comparison, additional pens are used for formulas B, C, and D, for example, but with a plurality of pens for separate formula tests, it is inevitable that they cannot all be in the exact same location and therefore variations in relation to sun, shade and many other factors which affect the feeding process and habits of the animals become factors adversely affecting the accuracy and true comparative value of the test results.

Having observed these disadvantages inherent in present test methods, I have devised a new and improved method for overcoming such disadvantages and have adapted certain known apparatus in a novel way for cooperation in carrying out said method.

According to the present invention my new test methods relative to the value and effect of specific feeds and feed formulas on a given type of livestock contemplates the test feeding of a plurality of like animals in a single pen under circumstances where each animal will be fed a different feed formula under test and where the amount of feed consumed per animal in a given period is susceptible of exact determination.

Another important object contemplated herein is the provision of individual feeding stalls within a single pen with each stall supplied with a feed trough having a different feed formula, and including electrically operated closures for each respective feed trough.

A further object inhering in this invention is the provision of a signal-producing device, worn by each respective animal, and adapted for actuating the closure on only one of said feed troughs whereby each animal can obtain feed from only one predetermined trough.

To attain these objects and such further objects as may appear herein, or be hereinafter pointed out, I make reference to the accompanying drawings forming a part hereof, in which:

FIG. 1 is a perspective view illustrating a plurality of animals feeding in respective stalls within a single pen and also showing the movable gate-like closures for the respective feed troughs, and FIG. 2 is a side view, partly in section, of a stall taken from the line 2—2 of FIG. 1 to illustrate the trough closure and the actuating signal device therefor, it being pointed out that the animal wearing such device is not shown.

Referring to the drawings the slab 10 represents the floor of a single pen, indicated generally by the number 12, which may be provided with any form of a suitable enclosure (not shown). Within pen 12 there is constructed a plurality of adjacent feeding stalls all designated by the numeral 14 and preferably not exceeding five feet in length. No specific construction of stalls 14 is required, it being only necessary that they be generally elongated as shown, open at one end and narrow enough so that with regard to the type of animal 16 with which they will be used, they are not wide enough for the animal to turn around in and thus the animal must enter head first and back out. As illustrated in FIG. 1 only four stalls are shown but it will be understood that this is only illustrative and the number may be varied as desired.

Opposite the open end of stalls 14 there is provided a feed trough 18 as a longitudinal extension thereof and located at a height suitable for the animal 16 to feed from after entering the stall. Each trough 18 is so constructed so as to be separate and distinct from other like troughs in order that the feed (not shown) supplied to each trough is inaccessible from all stalls except the stall with which it is directly associated. Troughs 18 are supported by rails 20 and 22, rear posts 24 and intermediate posts 25 which form the stall structure together with the forward posts 26.

On the end of each feed trough 18 from which the animal 16 will feed (FIG. 1) and which I shall refer to as the forward end, there is mounted a vertical reciprocating barrier gate or closure 28. Preferably gates 28 are shown as being formed with the respective spaced horizontal rails 30 and the spaced vertical bars 32 which form a frame-like structure mounted for vertical reciprocation in spaced upstanding parallel tracks 34. Construction of gates 28, may of course, be varied so long as in its downward or closed position illustrated at 36, it denies access by the animal to the feed (not shown) in the trough 18 and also preferably permits visual observation of the feed from the stall side. Likewise, in the upper or open position of the gate 28, shown at 38, free access to trough 18 is available to the animal.

No invention per se is claimed in the means for reciprocating the gates or closures 28 as many types of commercial devices available for this purpose for various kind of garage doors, gates and the like may be easily adapted to the structure described here. By way of illustration, however, the means used here includes a rack and pinion apparatus in which a rack 40 is secured to and depends from the lower rail 30 of each gate 28 at one end thereof so as to travel in track 34 through a member 42 which represents an electrically operated motor having a pinion in engagement with rack 40 in a well-known manner. Since the details of construction per se of member 42 and of the actuating device therefore to be referred to later are not claimed as novel, they are shown only schematically, it being understood that they are susceptible of adjustment whereby racks 40 can normally be maintained in their lowermost position so that gates 28 are closed but which gates can, by an appropriate signal or switching device acting on member 42, be elevated to open position until the operable function of such signal or switch is terminated to permit the gates to be returned to closed position.

Switching apparatus for actuating member 42 to elevate and lower racks 40 is contained within a radio wave receiving unit 44 by which the actuation of such switching apparatus is effected by the receipt of a transmitted radio signal. This type of receiver 44 is suitably mounted to post 25, or in any other convenient place, and will be electrically connected to member 42 in a well-known manner. Such a receiver 44, as referred to, is also commercially available in several forms and is thus shown only in outline.

The signal to be received by receiver 44 is transmitted by a battery operated oscillator or transmitter 46 which is of known construction and which for purposes here includes a battery capable of permitting a continuous radio wave transmission for approximately sixty hours. Such oscillator 46 as used here, will be adjusted for directional transmission, have an effective range of preferably two to three feet, and be tuned to broadcast only on a predetermined frequency. Where a plurality of oscillators 46 are used within a single pen 12 (FIG. 1) each will transmit on a different frequency and each receiver 44 will be tuned to receive on only one of the frequencies being used by the several oscillators 46. It will thus be appreciated that the signal from each oscillator 46 can effectively operate in respect to only one of the receivers 44.

With the above described equipment and apparatus which has been assembled from known constructions but oriented in the novel relationship indicated, one of the important aspects herein includes the placing of the oscillator 46 upon each animal 16 within pen 12. Preferably this is done by suspending the oscillator from a strap or the like 48 which can be placed on the animal like a collar (FIG. 1) so that the oscillator hangs adjacent the chest and is oriented for directional transmission as shown in FIG. 2.

In the use of the foregoing apparatus for carrying out my new feed testing method, it is pointed out that each trough 18 will be supplied with a different type of feed preparation or mixture to be tested and the amount so placed in each trough is carefully measured and weighed. It will thus be appreciated that several feed formulas can be tested simultaneously in the same environment and under like conditions with a group of animals that will be selected for their common and like characteristics necessary to a proper evaluation of the results observed and recorded. The matter of inducing or training an animal to feed from only a designated trough is a relatively simple procedure and in my test methods the animal is quickly adapted to the condition that it can obtain feed from only one trough.

Since the feed is visible, the animal naturally approaches it by entering the stall head first and because of the narrowness of the stall, receiver 44 will of necessity be within the directional pattern of the oscillator 46. As the animal approaches the trough 18 and the signal from the oscillator 46 reaches the receiver 44, the gate 28 will be elevated as described. Thus each animal can feed according to its own desires and at the conclusion of the testing program, the exact amount of feed consumed per animal can be determined together with other data such as frequency of feeding, amount consumed per feeding, if desired, and the like.

As the animal concludes any particular feed interval and leaves the stall, the gate 28 is automatically closed as soon as the oscillator 46 is withdrawn from effective range relative the receiver 44.

As indicated above, the number of stalls per pen may be varied from the four shown so if eight stalls were used, for example, eight different formulas can be tested in one pen. At the time, for even better evaluation of the results, such pens may be duplicated as many times as desired. For example, in this regard there may be eight pens with eight stalls each and with the same formulas used in each pen. By such an arrangement, it will be appreciated that all eight formulas can be simultaneously tested under eight different pen situations. This not only affords better and more accurate data but also eliminates a substantial amount of pen structure required under present practices to obtain the comparable amount of data and also reduces materially the time necessary to obtain such data over present methods.

It will also be appreciated that the method and apparatus described herein for assuring that a given animal will feed from a given stall may be adapted without change for feeding a plurality of animals even where the same formula may be used but in different selected amounts for different animals.

From the foregoing description it is thought a full understanding of this invention will be had and the advantages of the same will be appreciated.

It will be understood that the phraseology employed herein is for the purpose of description and not for limitation and that modifications and changes can be made within the scope of what is claimed, without departing from the spirit and purpose thereof.

I claim:
1. A method of feeding a plurality of animals in a common environment which consists of:
confining a predetermined number of like animals within an enclosure,
providing a plurality of individual feed stalls with respective feed troughs at one end,
placing a normally closed locked gate on each feed trough to normally prevent access thereto by an animal,
supplying a measured amount of a given feed formula to as many feed troughs as the number of animals confined,
placing on each of said animals a means for unlocking and opening a different one of said respective gates, and
accustoming each animal to effect the opening of said respective gate and permitting such animal to enter and leave and feed at will only from the trough associated therewith.

2. A method of feeding a plurality of animals in a common environment which consists of:
providing an enclosed feeding area having a predetermined number of individual feeding stalls,
confining within said feeding area a number of like animals equal to the number of feeding stalls,
supplying a measured amount of a given feed formula to each respective feeding stall,
providing each feeding stall with a locked closure which normally prevents access by an animal to the feed therein without denying visual observation to the animal of said feed,
placing on each respective animal a means for unlocking a different one of said respective closures, and
accustoming each animal to effect the opening of said respective closure and permit it to enter and leave and feed at will only in the stall associated therewith.

3. In apparatus for feeding a plurality of animals, the combination of:
an enclosed feeding pen,
a plurality of individual stalls in said pen,
a feed-holding trough at corresponding ends of each respective stall,
a normally closed gate on each trough,
a separate like electrically operated means connected to each respective gate for opening the same on actuation and returning said gate to closed position upon deactuation,
a plurality of continuously operating electrical signal-producing devices each constructed to be effective relative to a different one of said electrically operated means for effecting the opening and return to closed position of a different gate, and each of said signal-producing devices adapted to be worn by a different animal to be placed in said pen for a predetermined period of time.

4. Apparatus as defined in claim 3 wherein each trough is supplied with a measured amount of a different feed formula.

5. Apparatus as defined in claim 3 wherein said gates are constructed so as to permit visual observation from said stalls of said troughs and the contents thereof even when said gates are in closed position.

6. Apparatus as defined in claim 3 wherein the effective range of said signal-producing devices relative to said electrically operated means is not greater than the length of said stalls.

7. In apparatus for feeding a plurality of animals, the combination of:

an enclosed feeding pen, a plurality of individual stalls in said pen, a feed-holding trough at corresponding ends of each respective stall, a normally closed vertically reciprocating gate on each trough, a separate like electrically operated means connected to each respective gate for effecting vertical reciprocation of said respective gates, a radio wave receiver on each trough connected to a respective electrically operated means for actuating the same upon receipt of a predetermined signal, a plurality of continuously operating radio wave signal-producing devices each constructed to be effective relative to a different one of said receivers for effecting the opening and return to closed position of a different gate, and each of said signal-producing devices adapted to be worn by a different animal to be placed in said pen for a predetermined period of time.

8. Apparatus as defined in claim 7 wherein each receiver is tuned to a different frequency and each respective signal-producing device is set to transmit on a different one of said frequencies so as to be effective relative to a different one of said gates.

9. In apparatus for feeding a plurality of animals, the combination of:

an enclosed feeding pen, a plurality of individual stalls in said pen, a feed-holding trough at corresponding ends of each respective stall, a normally closed locked barrier on each stall, a plurality of means each specifically designed for unlocking only one of said respective barriers, and one of said means being worn by each animal of a group to be placed in said pen whereby each animal can effect the unlocking of only one barrier and can enter therethrough at will to feed.

10. Apparatus as defined in claim 9 wherein said respective means effects the locking of said respective barriers when the animal leaves the stall.

11. In apparatus for feeding a plurality of animals, the combination of:

an enclosed feeding pen, a plurality of stalls open only at one end, a feed trough at the closed end of each stall, a normally closed electrically actuated locked closure across the open end of each stall, a plurality of electrical actuated closure unlocking and opening devices each for unlocking and locking only a different one of said respective closures, and one of said actuating devices being worn by each animal in a selected group of which all will be simultaneously confined within said pen so that each animal can feed at will but only in a preselected stall.

12. In apparatus for feeding a plurality of animals, the combination of:

an enclosed feeding pen, a plurality of stalls open only at one end, a feed trough at the closed end of each stall, a normally closed electrically actuated locked barrier across the open end of each stall, a plurality of electrical barrier actuating devices each adapted to be worn by a different animal in a selected group of which all will be simultaneously confined within said pen, each of said actuating devices effecting the unlocking and locking of only a different one of said respective barriers but only when in close proximity thereto, and said actuating devices affording means to said animals to enter a preselected stall at will and to effect the locking of the barrier to said stall as it leaves the same so that an open barrier for said stall is not presented to any other animal in said pen.

References Cited by the Examiner

UNITED STATES PATENTS

| | | | |
|---|---|---|---|
| 2,118,930 | 5/38 | Lilja | 340—171 |
| 2,358,000 | 9/44 | Cornell | 119—14.04 |
| 2,558,434 | 6/51 | Hofberg | 340—171 |
| 2,685,863 | 8/54 | Martin | 119—51 |
| 2,800,104 | 7/57 | Cameron et al. | 119—29 |
| 2,814,271 | 11/57 | Black | 119—55 |
| 2,929,356 | 3/60 | Bacigalupo | 119—51 |
| 3,009,443 | 11/61 | McCabe | 119—55 |

SAMUEL KOREN, *Primary Examiner.*

ALDRICH F. MEDBERY, *Examiner.*